United States Patent [19]
Yin et al.

[11] Patent Number: 5,517,153
[45] Date of Patent: May 14, 1996

[54] POWER SUPPLY ISOLATION AND SWITCHING CIRCUIT

[75] Inventors: Rong Yin, Coppell; Glenn T. O'Rourke, Flower Mound, both of Tex.

[73] Assignee: SGS-Thomson Microelectronics, Inc., Carrollton, Tex.

[21] Appl. No.: 474,493

[22] Filed: Jun. 7, 1995

[51] Int. Cl.$^6$ ........................................... G05F 1/10
[52] U.S. Cl. ........................ 327/546; 327/408; 327/541
[58] Field of Search ................................. 327/141, 408, 327/538, 541, 546; 323/272

[56] References Cited

U.S. PATENT DOCUMENTS

| | | | |
|---|---|---|---|
| 4,492,876 | 1/1985 | Colbert et al. | 365/229 |
| 4,816,739 | 3/1989 | Sakurai et al. | 323/272 |
| 5,070,255 | 12/1991 | Shin | 327/408 |
| 5,306,961 | 4/1994 | Leo | 327/546 |
| 5,338,978 | 8/1994 | Larsen et al. | 307/443 |

*Primary Examiner*—Margaret Rose Wambach
*Attorney, Agent, or Firm*—David C. Carlson; Lisa K. Jorgenson

[57] ABSTRACT

A power supply isolation and switching circuit formed in a semiconductor structure which eliminates a parasitic diode effect. The switching circuit receives a first power source and a second power source, and selects between the two sources to provide the selected power source to a load device. The switching circuit includes a first transistor, and second and third transistors. The first transistor is connected to the first power source for selecting the first power source as the supply voltage of the load device. The second and third transistors are connected in series to the second power source for selecting the second power source. The second and third transistors are formed in two separate wells of a first conductivity type that are spaced apart and isolated from each other by a semiconductor region of a second conductivity type different from the first conductivity type. In operation, when the voltage level of the first power source is higher than a predetermined voltage, the first transistor is turned on to connect the first power source to the load device, and the second and third transistors are turned off to isolate the second power source from the load device. When its voltage falls below the predetermined voltage, however, the first transistor is turned off to isolate the first power source and the second and third transistors are turned on to connect the second power source to the load device.

21 Claims, 2 Drawing Sheets

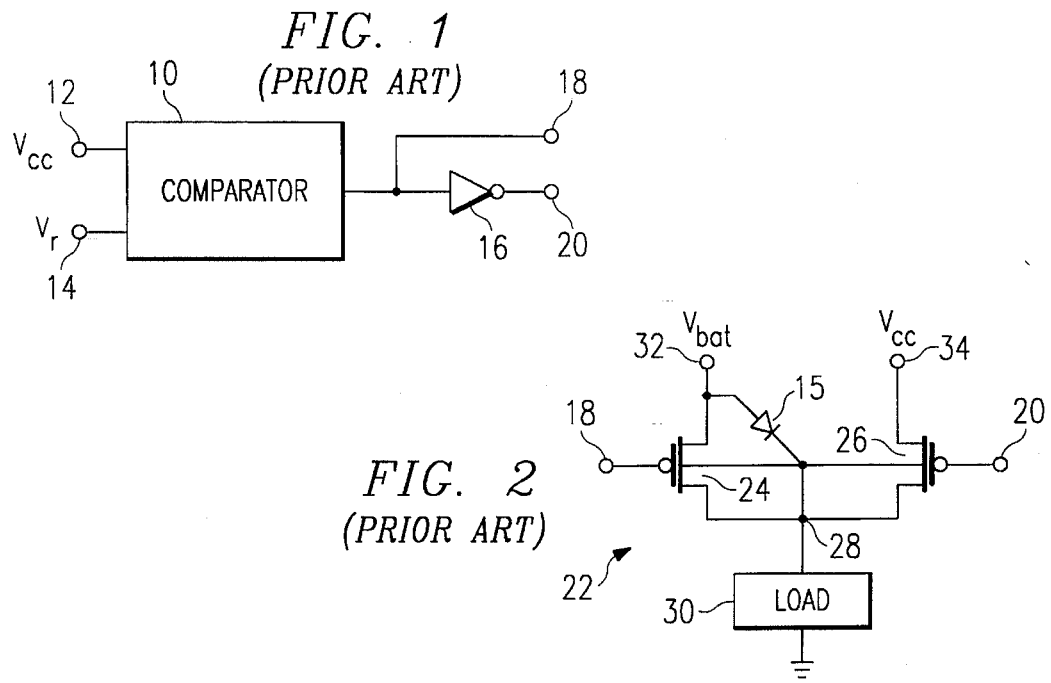
FIG. 1 (PRIOR ART)
FIG. 2 (PRIOR ART)
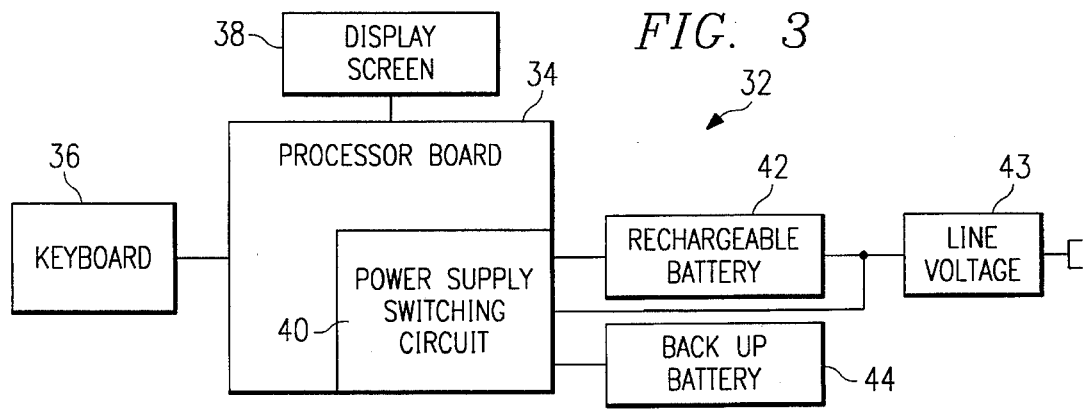
FIG. 3
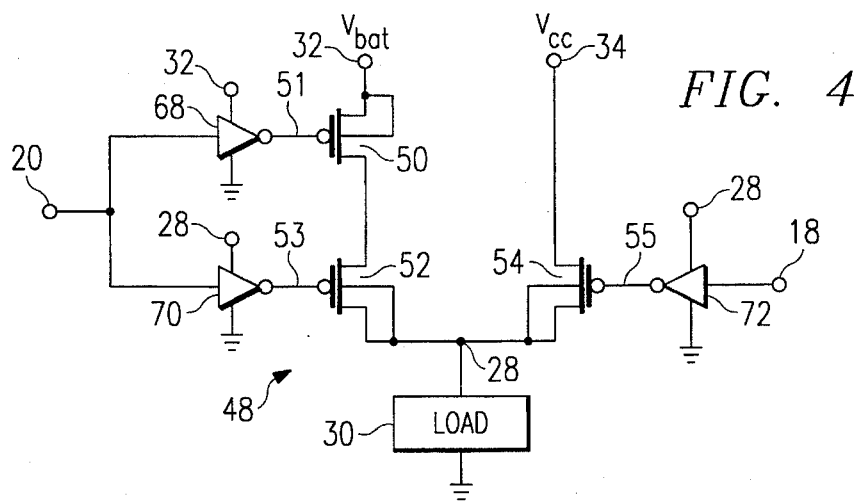
FIG. 4

POWER SUPPLY ISOLATION AND SWITCHING CIRCUIT

TECHNICAL FIELD

This invention relates to integrated circuit devices and, more particularly, to a power supply switching circuit formed in a semiconductor structure.

BACKGROUND OF THE INVENTION

Power supply switching circuits for providing power to electronic circuits or load devices are well known in the art. The switching circuit is coupled to primary and secondary power supply sources. The circuit compares the voltage of the primary power supply against a reference voltage, and switches the load to the secondary power supply when the primary supply voltage falls below the reference voltage.

A typical application of the power supply switching circuit is in the area of portable electronic devices such as notebook computers. The computers generally have line voltage or a rechargeable battery as the primary power supply source. The secondary, power supply source is a back-up battery, such as a lithium battery, for providing power to the computer when the rechargeable battery voltage falls below an operation voltage level. The power supply switching circuit monitors the voltage level of the rechargeable battery and switches to the back-up battery widen the rechargeable battery sufficiently drains to fall below the reference voltage.

Typically, integrated circuit (IC) chips in a computer have a normal operating voltage of 5 volts or 3.2; volts. Hence the rechargeable battery, when fully charged, generates 5 volts, 3.3 volts or the like. The backup battery such as the lithium battery generates a voltage level in the range of 3–3.5 volts. For the 5 volt IC chips, the voltage level of the back-up battery is not ideal but is sufficiently high to operate the chips for a short period of time. IC chips that require 5 volts are not ideally suited for portable applications because they draw relatively high current and run relatively hot. For these reasons, the semiconductor industry have started to produce IC chips that have a normal operating voltage of 3 volts or less. Because the 3 volt operating voltage of those IC chips is below the back-up battery voltage, it has caused a problem in the operation of the prior art switching circuit. When the switching circuit is providing power from the rechargeable battery, a parasitic diode in the switching circuit may become forward biased and drain power from the back-up battery. The problem may cause shorter life for the back-up battery, and may even lead to a system failure of the load device being driven. This occurs when the switching circuit switches to the back-up battery when it has discharged below the minimum operating voltage of the load device.

Therefore, it is desirable to provide a power supply switching circuit that prevents unnecessary current drain from the back-up battery when the normal operational voltage of the circuit is below the back-up battery voltage.

SUMMARY OF THE INVENTION

According to the principles of the present invention, a power supply isolation and switching circuit formed in a semiconductor structure is provided. The switching circuit is coupled to a first power source and a second power source, and selects between the two sources to connect the selected power source to a load device. The switching circuit includes three switches, usually in the form of three transistors. The first transistor is connected to the first power source for selecting the first power source as the supply voltage of the load device. The second and third transistors are connected in series to the second power source for selecting the second power source. The second and third transistors are formed in two separate wells of a first conductivity type that are spaced apart and isolated from each other by a semiconductor region of a second conductivity type different from the first conductivity type. In operation, when the voltage level of the first power source is higher than a threshold voltage, the first transistor is turned on to connect the first power source to the load device, and the second and third transistors are turned off to isolate the second power source from the load device. When the voltage of the first source falls below the threshold voltage, the first transistor is turned off to isolate the first power source and the second and third transistors are turned on to connect the second power source to the load device.

BRIEF DESCRIPTION OF THE DRAWINGS

FIG. 1 is a diagram of a known comparator circuit for comparing a primary power supply voltage to a reference voltage.

FIG. 2 is a circuit diagram of a power supply switching circuit according to the prior art.

FIG. 3 is a block diagram of a computer system having a dual power supply and switching circuit according to the present invention.

FIG. 4 is a circuit diagram of a power supply switching circuit formed in an integrated circuit having N-wells according to a preferred embodiment of the present invention.

DETAILED DESCRIPTION OF THE INVENTION

Figure 5:
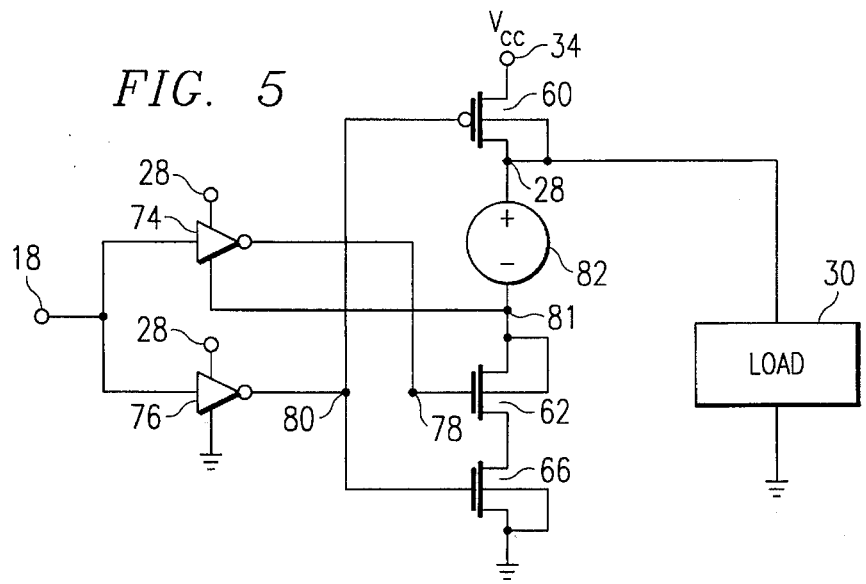
FIG. 5 is a circuit diagram of the power supply switching circuit formed in an integrated circuit having P-wells according to a preferred embodiment of the present invention.

FIG. 1 is a diagram of a prior art comparator circuit for comparing a primary power supply voltage to a reference voltage. A comparator 10 provides control signals to be used by a power supply switching circuit. One input 12 of the comparator 10 receives a primary power supply $V_{cc}$, and the other input 14 receives a reference voltage $V_r$. The output 18 of the comparator 10 is connected to an inverter 16 to generate an inverted output 20 of the comparator 10. The comparator 10 compares the voltage at the input 12 against the voltage at the input 14. When the voltage at the input 12 is greater than that of the input 14, the comparator 10 generates a logic high at its output 18, and the inverter 16 generates a logic low at the output 20. Conversely, when the voltage at the input 14 is greater than the voltage at the input 12, the comparator 10 generates a logic low at the output 18, and the inverter 16 generates a logic high at the output 20.

FIG. 2 is a circuit diagram of a power supply switching circuit according to the prior art. The power supply switching circuit 22 comprises a pair of PMOS transistors 24 and 26. The PMOS transistor 24 is connected between a secondary power supply terminal $V_{bat}$ 32 and a load terminal 28. The PMOS transistor 26 is connected between the primary power supply terminal $V_{cc}$ 34 and the load terminal 28. In an integrated circuit of the N-well type, a parasitic diode 15 is formed by the P+ source region (not shown) and the N-well (not shown) of the transistor 24. In order to reverse bias the parasitic diode 15, the substrate of the transistor 24 is connected or biased to the load terminal 28, which is the highest voltage available in the switching circuit 22. In operation, when the primary power supply voltage $V_{cc}$ is greater than the reference voltage $V_r$, the input 18 is at logic high and the input 20 is at logic low. The logic low signal at the input 20 turns on the transistor 26 and provides $V_{cc}$ to a load device 30 at the load terminal 28. In the meantime, the logic high signal at the input 18 turns off the transistor 24 and isolates $V_{bat}$ from the load terminal 28. For 5 volt load devices, the parasitic diode 15 is reversed biased since $V_{cc}$ is at 5 volts and $V_{bat}$ is at approximately 3–3.5 volts. When $V_{cc}$ falls below $V_r$, the input 18 switches to a logic low and the input 20 switches to a logic high. The logic high signal at the input 20 turns off the transistor 26, and isolates $V_{cc}$ from the load device 30. The logic low signal at the input 18 turns on the transistor 24, and provides $V_{bat}$ to the load device 30.

The problem recognized by the applicants is that when the load device 30 requires a 3 volt operating voltage and the secondary power supply $V_{bat}$ is above 3 volts, the parasitic diode 15 becomes forward biased and the current from the secondary power supply rapidly drains through the diode 15 and the terminal 34 of the primary power supply $V_{cc}$ until $V_{bat}$ falls to $V_{cc}$. This leads to shorter life of the secondary power supply, and may even lead to a system failure of the load device 30. This occurs when the switching circuit 22 tries to switch to the secondary power supply when it had discharged below the minimum operating voltage of the load device 30.

FIG. 3 is a block diagram of a computer system having a dual power supply and switching circuit according to the present invention. The system 32 comprises a keyboard 36, display screen 38, and processor board 34. The processor board 34 includes the power supply switching circuit 40 according to the present invention. The switching circuit 40 compares the voltage level of a primary power supply, such as the rechargeable battery 42 or the line voltage 43 against a reference voltage level. The primary power supply voltage $V_{cc}$ can be either a large rechargeable battery or line voltage, and known circuits may be used to select which of these is provided as $V_{cc}$, depending on the availability of the line voltage. When the voltage of the primary power supply is higher than the reference voltage, the switching circuit connects the primary power supply to the system 32. Otherwise, the switching circuit 40 connects the back-up battery 44 to the system 32. When the primary power supply is providing power to the system 32, the switching circuit 40 prevents the back-up battery 44 from unnecessarily draining its current through the switching circuit 40.

FIG. 4 is a circuit diagram of the power supply switching circuit formed in an integrated circuit having N-wells according to a preferred embodiment of the present invention. A PMOS transistor 54 is connected between a primary power supply $V_{cc}$ 34 and a load device 30. The substrate of the transistor 54 is connected to a load terminal 28 in a well known manner. A pair of PMOS transistors 50 and 52 are connected in series with each other. The source of the transistor 50 is connected to a secondary power supply $V_{bat}$ 32. The two transistors 50 and 52 are formed in separate N-wells to isolate the transistors from each other. In order to eliminate the parasitic diode effect, the N-well in the substrate for the transistor 50 is connected to the source 32 of the transistor 50 while the N-well in the substrate for the transistor 52 is connected to the drain or the load terminal 28.

In a preferred embodiment, the input terminals 51, 53, and 55 are connected to the outputs of inverters 68, 70 and 72, respectively. Again, the body and power of inverter 68 is coupled to $V_{bat}$ while the inverters 70, 72 have their body and power coupled to the switched voltage at the load terminal 28. The inverter 68 is powered by $V_{bat}$ to make sure the transistor 50 is in an off state when $V_{cc}$ is at a lower voltage level than $V_{bat}$.

In operation, when $V_{cc}$ is greater than $V_r$, the comparator 10 generates a logic high at the terminal 18. The inverter 72 inverts the high logic signal and generates a logic low signal at the output 55. The logic low signal at the output 55 turns on the transistor 54 and connects $V_{cc}$ to the load device 30 at the load terminal 28. The terminal 20, on the other hand, generates a logic low signal when $V_{cc}$ is greater than $V_r$. The inverters 68 and 70 generate a logic high at the outputs 51 and 53. In turn, the logic high signals turn off the transistors 50 and 52 and isolate the secondary power supply $V_{bat}$ from the load device 30. When $V_{cc}$ drops below $V_r$, however, the comparator 10 switches to a logic low at the terminal 18. The inverter 72 inverts the low logic signal and generates a logic high signal at the output 55. The logic high signal at the output 55 turns off the transistor 54 and isolates the primary power supply $V_{cc}$ from the load device 30. The terminal 20, on the other hand, is at a logic high when $V_{cc}$ is lower than $V_r$. The inverters 68 and 70 generate a logic low at the outputs 51 and 53. In turn, the logic low signals turn on the transistors 50 and 52 and connects the secondary power supply $V_{bat}$ to the load device 30 at the load terminal 28.

While only the preferred embodiment is illustrated, various alternative embodiments are possible. For example, the input terminals 51 and 53 may be connected to the terminal 18, and the input terminal 55 to the terminal 20 to eliminate the need for the inverters 68, 70, and 72. In this embodiment, the input terminals 51 and 53 receive a logic high signal from the input 18 when $V_{cc}$ is greater than $V_r$. The logic high signal turns off the transistors 50 and 52 to isolate the $V_{bat}$ from the load device 30. The input terminal 55, however, receives a logic low signal from the input 20 when $V_{cc}$ is greater than $V_r$. The logic low signal turns on the transistor 54 to provide the load device 30 with $V_{cc}$ at the load terminal 28. Conversely, the input terminal 55 switches to a logic high signal when $V_{cc}$ falls below $V_r$. The logic high signal turns off the transistor 54 to isolate $V_{cc}$ from the load device 30. The input terminals 51 and 53, however, switch to a logic low. The logic low signal turns on the transistors 50 and 52 to provide $V_{bat}$ to the load device 30.

FIG. 5 is a circuit diagram of the power supply switching circuit formed in an integrated circuit having P-wells according to a preferred embodiment of the present invention. A PMOS transistor 60 is connected between a primary power supply $V_{cc}$ 34 and a load device 30. The positive terminal 28 of a secondary power supply 82 is connected to the load device 30. A pair of NMOS transistors 62 and 66 are connected in series between the negative or ground terminal 81 of the secondary power supply 82 and a ground. The two transistors 62 and 66 are formed in separate P-wells to isolate the transistors from each other. The P-well in the substrate for the transistor 66 is connected to the system ground. The P-well substrate for the transistor 62, however, is connected to the negative terminal 81 of the secondary power supply 82. The body of each transistor being coupled to a different ground prevents a diode from being formed to drain power from the back-up battery.

In a preferred embodiment, an inverter 74 is connected to the gate 78 of the transistor 62, and an inverter 76 is connected to the gate 80 of the transistors 60 and 66. The inverter 76 is grounded to the same ground as the system ground while the inverter 74 is grounded to the voltage level of the negative terminal of the secondary power supply 82.

In operation, when $V_{cc}$ is greater than $V_r$, the terminal 18 generates a logic high, which causes the inverter 74 to generate a logic low at its output 78, and the inverter 76 to generate a logic low at its output 80. The logic low signal at the input 78 turns off the transistor 62 and the logic low at the input 80 turns off the transistor 66 to isolate the negative terminal of the secondary power supply 82 from the ground. The logic low signal at the input 80, however, turns on the transistor 60 to provide the load device 30 with the primary power supply $V_{cc}$ at the load terminal 28. When $V_{cc}$ falls below $V_r$, the input 18 switches to a logic low signal, which causes the inverter 74 to generate a logic high at its output 78 and the inverter 76 to generate a logic high at its output 80. The logic high signal at the input 80 causes the transistor 60 to turn off and isolates $V_{cc}$ from the load device 30. The logic high signal at the input 80 also turns on the transistor 66. The logic high signal at the input 78 turns on the transistor 62. Since both transistors 62 and 66 are turned on, the negative terminal of the secondary power supply 82 is connected to the ground through the transistors 62 and 66. Thus, the secondary power supply 82 provides power to the load device 30 when $V_{cc}$ falls below $V_r$.

Figure 6:
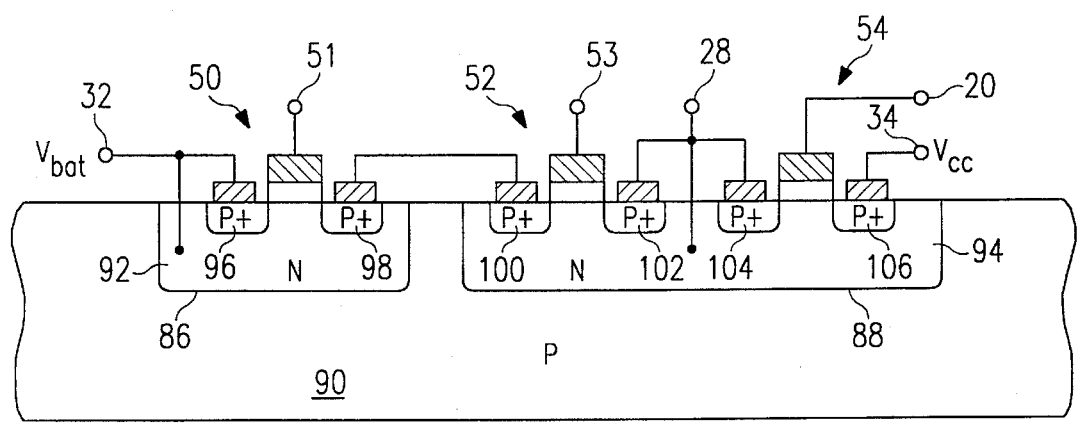
FIG. 6 is a cross-sectional view of a semiconductor structure incorporating features of the power supply switching circuit of FIG. 4.

FIG. 6 is a cross-sectional view of a semiconductor structure incorporating features of the power supply switching circuit of FIG. 4. The transistor 50 is in a first N-well 86 and the transistors 52 and 54 are in a second N-well 88. The transistors 50, 52 are isolated from each other by a P-type substrate 90. The substrate 92 of the first N-well 86 and the source region 96 are connected to the secondary power supply $V_{bat}$ 32 while the substrate 94 of the second N-well 88, the drain region 102 of the transistor 52, and the source region 104 of the transistor 54 are all connected to the supply voltage of the load terminal 28. The transistors 50 and 52 are connected in series with each other through the drain region 98 and the source region 100. In the embodiment shown, the source region 96 and the N-well substrate 92 form the parasitic diode 15. Since both nodes of the diode 15 are at the same voltage potential $V_{bat}$, the possibility of forward biasing the diode 15 is eliminated.

Figure 7:
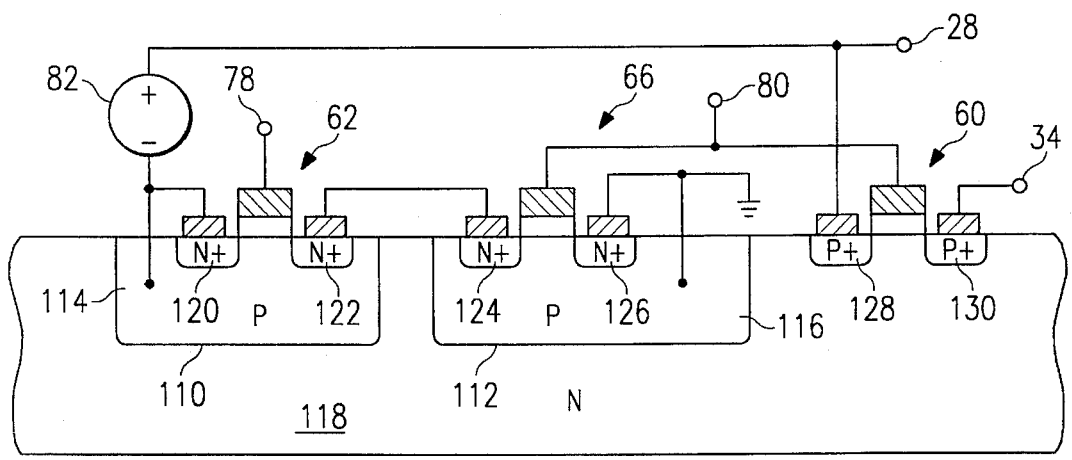
FIG. 7 is a cross-sectional view of a semiconductor structure incorporating features of the power supply switching circuit of FIG. 5.

FIG. 7 is a cross-sectional view of a semiconductor structure incorporating features of the power supply switching circuit of FIG. 5. The transistor 62 is in a first P-well 110 and the transistor 66 is in a second P-well 112. The transistor 60 is in an N-substrate 118. The transistors 62 and 66 are isolated from each other by the N-substrate 118. The substrate 114 of the first P-well 110 and the drain region 120 are connected to the negative terminal of the secondary power supply 82, while the substrate 116 of the second P-well 112, and the source region 126 of the transistor 66 are connected to the ground. The transistors 62 and 66 are connected in series with each other through the source region 122 and the drain region 124. The gates of the transistors 60 and 66 are connected together and receive a logic signal opposite that received by the gate of the transistor 62.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

We claim:

1. A switching circuit formed in a semiconductor structure for switching between a first power source and a second power source to provide a supply voltage to a load device, comprising:

a first switch connected between the first power source and the load device, the switch having a first input for receiving a control signal to connect the first power source to the load device when the voltage of the first power source is higher than a threshold voltage;

a second switch connected to the second power source, the second switch being formed in a first well of a first conductivity type in the semiconductor structure, the second switch having a second input; and a third switch connected in series with the second switch, and formed in a second well of the first conductivity type in the semiconductor structure, the third switch having a third input, the first and second wells being two separate wells of a first conductivity type that are spaced apart and isolated from each other by a semiconductor region of a second conductivity type different from the first conductivity type, the second and third inputs for receiving a control signal to connect the second power source to the load device when the voltage of the first power source is lower than the threshold voltage.

2. The switching circuit according to claim 1 wherein the first well is of an N conductivity type, and is connected to the second power source.

3. The switching circuit according to claim 2, further comprising a first inverter connected to the second switch, and powered by the second power source.

4. The switching circuit according to claim 3, further comprising:

a second inverter connected to the third switch; and a third inverter connected to the first switch, the second and third inverters being powered by the supply voltage of the load device.

5. The switching circuit according to claim 2 wherein each of the first, second and third switches is a PMOS transistor.

6. The switching circuit according to claim 2 wherein the first switch is formed in the second well.

7. The switching circuit according to claim 2 wherein the second and third inputs are connected to each other.

8. The switching circuit according to claim 1 wherein the first well is of a P conductivity type, and is connected to a ground of the second power source.

9. The switching circuit according to claim 8, further comprising a first inverter connected to the second switch, and powered by the supply voltage of the load device with respect to a ground of the second power source.

10. The switching circuit according to claim 9, further comprising a second inverter connected to the first and third switches, and powered by the supply voltage of the load device with respect to a ground of the switching circuit.

11. The switching circuit according to claim 8 wherein each of the second and third switches is an NMOS transistor, and the first switch is a PMOS transistor.

12. The switching circuit according to claim 8 wherein the first switch is formed in a substrate of the semiconductor structure.

13. The switching circuit according to claim 8 wherein the first and third inputs are connected to each other.

14. A power source switching circuit for providing a supply voltage to a load device, comprising:

a first power terminal for receiving a first power source;

a second power terminal for receiving a second power source, the load device being connectable to either the first power terminal or the second power terminal;

a first transistor connected between the first power terminal and the load device;

a second transistor connected to the second power terminal; and a third transistor connected in series with the second transistor, the second and third transistors being formed in two separate semiconductor regions of a first conductivity type that are spaced apart from each other and being isolated from each other by a semiconductor region of a second conductivity type different from the first conductivity type, the second and third transistors for connecting the second power terminal to the load device.

15. The switching circuit according to claim 14 wherein the semiconductor region of the second transistor is of an N conductivity type, and is connected to the second power terminal.

16. The switching circuit according to claim 15, further comprising a first inverter connected to the second transistor, and powered by the second power terminal.

17. The switching circuit according to claim 16, further comprising:

a second inverter connected to the third transistor; and a third inverter connected to the first transistor, the second and third inverters being powered by the supply voltage of the load device.

18. The switching circuit according to claim 14 wherein the second power terminal is a ground of the second power source, and the semiconductor region of the second transistor is of a P conductivity type and is connected to the second power terminal.

19. The switching circuit according to claim 18, further comprising a first inverter connected to the second transistor, and powered by the supply voltage of the load device with respect to the ground of the second power source.

20. The switching circuit according to claim 19, further comprising a second inverter connected to the first and third transistors, and powered by the supply voltage of the load device with respect to a ground of the switching circuit.

21. A system, comprising:

an input device;

a display screen;

a processor board connected to the input device and the display screen; and a switching circuit for providing a supply voltage to the processor board, and including:

a first power terminal for receiving a first power source;

a second power terminal for receiving a second power source, the processor board being connectable to either the first power terminal or the second power terminal;

a first transistor connected between the first power terminal and the processor board;

a second transistor connected to the second power terminal; and a third transistor connected in series with the second transistor, the second and third transistors being formed in two separate semiconductor regions of a first conductivity type that are spaced apart from each other and being isolated from each other by a semiconductor region of a second conductivity type different from the first conductivity type, the second and third transistors for connecting the second power terminal to the processor board.

* * * * *